United States Patent
Ron et al.

(10) Patent No.: US 10,420,123 B2
(45) Date of Patent: Sep. 17, 2019

(54) SYSTEMS AND METHODS FOR MULTI-USER COMMUNICATION

(71) Applicant: JRD COMMUNICATION INC., Shenzhen, Guangdong (CN)

(72) Inventors: Toledano Ron, Guangdong (CN); Benny Assouline, Colombes (FR); Guang Liu, Colombes (FR)

(73) Assignee: JRD COMMUNICATION INC., Shenzhen (CN)

( * ) Notice: Subject to any disclaimer, the term of this patent is extended or adjusted under 35 U.S.C. 154(b) by 0 days.

(21) Appl. No.: 15/553,014

(22) PCT Filed: Aug. 5, 2016

(86) PCT No.: PCT/CN2016/093589
§ 371 (c)(1),
(2) Date: Aug. 23, 2017

(87) PCT Pub. No.: WO2017/028691
PCT Pub. Date: Feb. 23, 2017

(65) Prior Publication Data
US 2018/0249480 A1    Aug. 30, 2018

(30) Foreign Application Priority Data
Aug. 14, 2015    (GB) .................................. 1514530.3

(51) Int. Cl.
*H04W 72/12*    (2009.01)
*H04B 1/00*    (2006.01)
(Continued)

(52) U.S. Cl.
CPC ............ *H04W 72/121* (2013.01); *H04B 1/00* (2013.01); *H04B 7/0452* (2013.01); *H04J 11/00* (2013.01);
(Continued)

(58) Field of Classification Search
CPC .................................................. H04W 72/121
See application file for complete search history.

(56) References Cited

U.S. PATENT DOCUMENTS

| | | | |
|---|---|---|---|
| 10,117,188 B2* | 10/2018 | Nory | H04L 1/1854 |
| 2011/0080965 A1* | 4/2011 | Liu | H04L 25/0224 |
| | | | 375/260 |

(Continued)

FOREIGN PATENT DOCUMENTS

| | | |
|---|---|---|
| CN | 105743824 A | 7/2016 |
| EP | 2 955 952 A1 | 12/2015 |

(Continued)

OTHER PUBLICATIONS

"Revised SID: Study on Downlink Multiuser Superposition Transmission for LTE," MediaTek Inc., 3G TSG RAN Meeting #68, Malmo, Sweden, Jun. 15-18, 2015, RP151100.

(Continued)

*Primary Examiner* — Parth Patel
(74) *Attorney, Agent, or Firm* — Baker & Hostetler LLP

(57) ABSTRACT

A method for configuring downlink multi-user transmission in a telecommunication network is provided. The method comprises receiving, at a first User Equipment (UE), data within a subframe wherein the data comprises a dynamic indicator; determining, by the first UE based on the received dynamic indicator, if the data within the subframe is for multi-user transmission, and if not so determined, using, by the first UE, a single-user receiver to decode the received data; and if so determined, identifying, by the first UE based on the dynamic indicator, at least one second UE that is paired with the first UE in multi-user transmission, and obtaining, by the first UE DCI information of said at least one second UE.

10 Claims, 5 Drawing Sheets

(51) Int. Cl.
*H04J 11/00* (2006.01)
*H04L 1/00* (2006.01)
*H04L 5/00* (2006.01)
*H04B 7/0452* (2017.01)
*H04J 99/00* (2009.01)

(52) U.S. Cl.
CPC ............... *H04J 15/00* (2013.01); *H04L 1/00* (2013.01); *H04L 5/0003* (2013.01)

(56) References Cited

U.S. PATENT DOCUMENTS

| | | | | |
|---|---|---|---|---|
| 2011/0176519 A1* | 7/2011 | Vitthaladevuni | .... | H04B 7/0452 370/336 |
| 2011/0222485 A1* | 9/2011 | Nangia | ............... | H04B 7/0452 370/329 |
| 2012/0127948 A1* | 5/2012 | Chung | ................ | H04L 5/0053 370/329 |
| 2012/0294255 A1* | 11/2012 | Seok | ................ | H04B 7/0452 370/329 |
| 2013/0070658 A1* | 3/2013 | Noh | ................ | H04W 52/0216 370/311 |
| 2013/0188630 A1* | 7/2013 | Song | ................ | H04W 84/12 370/338 |
| 2013/0265951 A1* | 10/2013 | Ng | ................ | H04W 72/042 370/329 |
| 2014/0057640 A1* | 2/2014 | Nagata | ................ | H04L 5/0035 455/450 |
| 2015/0131572 A1* | 5/2015 | Fan | ................ | H04W 52/146 370/329 |
| 2015/0171983 A1* | 6/2015 | Kusashima | ........... | H04J 11/004 370/329 |
| 2015/0189675 A1* | 7/2015 | Feuersaenger | ...... | H04W 52/281 370/329 |
| 2015/0282185 A1* | 10/2015 | Nikopour | .............. | H04L 1/0002 370/329 |
| 2016/0029350 A1* | 1/2016 | Kishiyama | ............ | H04W 16/28 370/329 |
| 2016/0095088 A1* | 3/2016 | Wong | ....................... | H04B 1/10 370/329 |
| 2016/0191174 A1* | 6/2016 | Hwang | .................. | H04B 15/00 375/348 |
| 2016/0191175 A1* | 6/2016 | Hwang | ................. | H04L 1/1822 370/329 |
| 2016/0204898 A1* | 7/2016 | Ghosh | ................. | H04B 7/0413 370/329 |
| 2016/0323862 A1* | 11/2016 | Lee | ..................... | H04W 52/325 |
| 2016/0330695 A1* | 11/2016 | Benjebbour | ........ | H04W 52/262 |
| 2017/0006608 A1* | 1/2017 | Josiam | .............. | H04W 72/0453 |
| 2017/0041906 A1* | 2/2017 | Tsai | ..................... | H04L 1/0009 |
| 2017/0150414 A1* | 5/2017 | Quan | .................... | H04W 36/20 |
| 2017/0230161 A1* | 8/2017 | Zhang | ................. | H04B 7/0617 |
| 2017/0230909 A1* | 8/2017 | Noh | .................. | H04W 52/0216 |
| 2017/0346598 A1* | 11/2017 | Safavi | ................. | H04J 11/0043 |
| 2018/0123759 A1* | 5/2018 | Zhang | ..................... | H04B 7/04 |
| 2018/0160402 A1* | 6/2018 | Huang | ............... | H04W 72/042 |
| 2019/0013911 A1* | 1/2019 | Muruganathan | ...... | H04L 1/0026 |

FOREIGN PATENT DOCUMENTS

| | | |
|---|---|---|
| WO | 2014/104114 A1 | 7/2014 |
| WO | 2014/122994 A1 | 8/2014 |
| WO | 2015/107818 A1 | 7/2015 |
| WO | 2015/167714 A1 | 11/2015 |

OTHER PUBLICATIONS

"Discussion on Possible PDCCH Modification for Downlink MUST," 3rd Generation Partnership Project (3GPP), Mobile Competence Centre, France 2015, XP050971969.

Qinghai Liu et al., "A Survey on Non-orthogonal Multiple Access Schemes," Dec. 31, 2014, pp. 98-101.

Extended European Search Report in European Patent Application No. 16836555.9, dated Dec. 19, 2017.

* cited by examiner

SYSTEMS AND METHODS FOR MULTI-USER COMMUNICATION

CROSS-REFERENCE TO RELATED APPLICATIONS

This application is a National Stage of International patent application PCT/CN2016/093589, filed on Aug. 5, 2016, which claims priority to foreign Great Britain patent application No. GB 1514530.3, filed on Aug. 14, 2015, the disclosures of which are incorporated by reference in their entirety.

TECHNICAL FIELD

Embodiments of the present invention generally relate systems and methods for telecommunications, and in particular relate to systems and methods for downlink multi-user transmission.

BACKGROUND

3GPP RAN1 WG has approved a study item "Study on Downlink Multiuser Superposition Transmission for LTE" (RP-151100) for studying Non-Orthogonal Multiple-Access (NOMA) for downlink, a technique for multiuser transmission. When coupled with a Successive Interference Cancellation (SIC) receiver at the User Equipment (UE) side, the NOMA technique is expected to achieve a capacity region in a multi-user environment.

FIGS. 1a and 2b show basic principles of the NOMA technique, according to which two or more UEs share the same resource, i.e. time-frequency slot(s), and the UEs are assigned with unequal powers. In the case where only two UEs are coupled, they may be referred to as near-user equipment ($UE_N$) 104 and far-user equipment ($UE_F$) 106. Ignoring the propagation channel, the received signal r of either of the UEs is given by the following equation—

$$r = \sqrt{\alpha_N} s_N + \sqrt{\alpha_F} s_F + n$$

Where $s_N$ and $s_F$ are the modulation symbols sent to $UE_N$ and $UE_F$ respectively and n is the noise. $\alpha_N$ and $\alpha_F$ are the normalized power ratios for the $UE_N$ 104 and the $UE_F$ 106 respectively and satisfy the following condition:

$$\alpha_N + \alpha_F = 1$$

A multi-user receiver is a receiver configured to demodulate mutually interfering streams of signals, each stream of signals being intended for a different user. In contrast, a single-user receiver is configured to demodulate signals intended for a single user without explicitly demodulating signals intended for other users.

In FIG. 1, because of the $UE_N$'s relative proximity to the base station (or eNode in an LTE network) 102, the signals intended for the $UE_N$ 104 may be assigned with a smaller amount of power compared to that assigned for the signals intended for $UE_F$ 106. Hence the $UE_N$ typically experiences relatively strong interference from the signals intended for $UE_F$.

In the NOMA technique, data packets intended for multiple users are sent within an LTE subframe over same physical resources. In the case of FIG. 1, a data packet intended for $UE_N$ 104 share the same physical resources with data packet intended for $UE_F$ 106. The $UE_N$ 104 will then need to use a multi-user receiver, which is able to extract the data/signals intended for the $UE_N$ 104 out of the received signal r.

The $UE_F$ 106 on the other hand, receives signals intended for the $UE_N$ 104 as weak signals and can often treat them as background noise. Hence the $UE_F$ may adopt a single-user receiver to directly decode its own signal out of the received signal r.

For the $UE_N$ 104 to correctly detect and filter out the signals intended for $UE_F$ 106, preferably it is configured to be familiar with the physical layer parameters of the transmission of $UE_F$ 106. These parameters are dynamically configured and included in a Downlink Control Indication (DCI) message intended for the $UE_F$, which is referred to as $DCI_F$. How a first UE (e.g. $UE_N$) could acquire the DCI information of a second UE (e.g. $UE_F$), which is paired with the first UE for the purpose of multi-user transmission has not been addressed so far.

The embodiments of the present invention provide improved techniques for Non-Orthogonal Multiple-Access (NOMA) in downlink multi-user transmission primarily in an LTE network.

The embodiments described below are not limited to implementations which solve any or all of the disadvantages of known systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

There is provided a method for configuring downlink multi-user transmission in a telecommunication network, the method comprising: receiving at the first UE, pre-configuration information for multi-user transmission, said pre-configuration information being provided over a radio link in signalling at a layer higher than a physical layer.

The method may further comprise receiving, at the first UE, data within a subframe wherein the data comprises a dynamic indicator; determining, by the first UE based on the received dynamic indicator, if the data within the subframe is for multi-user transmission, and if not so determined, using, by the first UE, a single-user receiver to decode the received data; and if so determined, identifying, by the first UE based on the dynamic indicator, at least one second UE that is paired with the first UE in multi-user transmission, and obtaining, by the first UE, DCI information of said at least one second UE.

The method may further comprise if it is determined that the data within the subframe is for multi-user transmission, decoding, by the first UE using a multi-user receiver and based on the DCI information of the at least one second UE, the received data to obtain data intended for the first UE.

The pre-configuration information may comprise an indication if multiuser transmission is enabled for the first UE.

The pre-configuration information may comprise C-RNTI of the UE(s) that may potentially be paired with the first UE in downlink multi-user transmission.

The pre-configuration information may comprise the portion of the total power allocated to the first UE.

The pre-configuration information may comprise a parameter indicating the total number, N, of UEs that the first UE may potentially be paired with in multi-user transmission.

The pre-configuration information may comprise a parameter indicating the number of UEs which the first UE is paired with in multi-user transmission.

The parameter indicating the number of UEs may indicate whether the first UE is, or is to be, paired with a single other UE or two other UEs in multi-user transmission.

Obtaining DCI information may comprise obtaining, by the first UE from the data transmitted within the subframe, DCI information of the at least one second UE.

Obtaining DCI information may comprise obtaining, by the first UE from the pre-configuration information, DCI information of the at least one second UE.

The pre-configuration information may comprise DCI information of UE(s) implementing Enhanced Coverage (CE).

Obtaining DCI information of the at least one second UE may comprise obtaining by the first UE said DCI information based on the C-RNTI of the at least one second UE.

There is also provided a method for configuring downlink multi-user transmission in a telecommunication network, the method comprising: receiving, at a first User Equipment (UE), data within a subframe wherein the data comprises a dynamic indicator; determining, by the first UE based on the received dynamic indicator, if the data within the subframe is for multi-user transmission, and if not so determined, using, by the first UE, a single-user receiver to decode the received data; and if so determined, identifying, by the first UE based on the dynamic indicator, at least one second UE that is paired with the first UE in multi-user transmission, and obtaining, by the first UE, DCI information of said at least one second UE.

The method may further comprise if it is determined that the data within the subframe is for multi-user transmission, decoding, by the first UE using a multi-user receiver and based on the DCI information of the at least one second UE, the received data to obtain data intended for the first UE.

The method may further comprise receiving at the first UE, pre-configuration information for multi-user transmission, said pre-configuration information being provided in signalling at a layer higher than a physical layer.

The pre-configuration information may comprise an indication if multiuser transmission is enabled for the first UE.

The pre-configuration information may comprise the portion of the total power allocated to the first UE.

The pre-configuration information may comprise C-RNTI of the UE(s) that may potentially be paired with the first UE in downlink multi-user transmission.

The pre-configuration information may comprise a parameter indicating the total number, N, of UEs that the first UE may potentially be paired with in multi-user transmission.

The pre-configuration information may comprise a parameter indicating the number of UEs which the first UE is paired with in multi-user transmission.

The parameter indicating the number of UEs may indicate whether the first UE is, or is to be, paired with a single other UE or with two other UEs in multi-user transmission.

Obtaining DCI information may comprise obtaining, by the first UE from the data transmitted within the subframe, DCI information of the at least one second UE.

Obtaining DCI information may comprise obtaining, by the first UE from the pre-configuration information, DCI information of the at least one second UE.

The pre-configuration information may comprise DCI information of UE(s) implementing Enhanced Coverage (CE).

Obtaining DCI information of the at least one second UE may comprise obtaining by the first UE said DCI information based on the C-RNTI of the at least one second UE.

There is also provided a method for configuring downlink multi-user transmission in a telecommunication network, the method comprising: sending, to a first UE, pre-configuration information comprising C-RNTI and/or DCI information of at least one second UE which may potentially be paired with the first UE in downlink multi-user transmission; and sending, to the first UE, data within one subframe comprising a dynamic indicator for indicating to the first UE if downlink multi-user transmission is applied to the data within the subframe.

The pre-configuration information may comprise an indication if multiuser transmission is enabled for the first UE.

The pre-configuration information may comprise the portion of the total power allocated to the first UE.

The dynamic indicator may also be usable by the first UE in identifying at least once second UE that is paired with the first UE in multi-user transmission.

The dynamic indicator may be provided in the CRC part of the DCI packet within the subframe or the CIF field of the data within the subframe.

The telecommunication network may be a LTE network and the data is sent within one LTE subframe.

The multiuser transmission may utilise Non-Orthogonal Multiple-Access (NOMA) for downlink.

There is also provided a method for configuring downlink multi-user transmission in a telecommunication network, the method comprising: sending to a first UE, pre-configuration information for multi-user transmission, said pre-configuration information being provided over a radio link in signalling at a layer higher than a physical layer.

The method may further comprise transmitting to the first UE data within a subframe wherein the data comprises a dynamic indicator.

The pre-configuration information may comprise an indication if multiuser transmission is enabled for the first UE.

The pre-configuration information may comprise the portion of the total power allocated to the first UE.

The pre-configuration information may comprise C-RNTI of the UE(s) that may potentially be paired with the first UE in downlink multi-user transmission.

The pre-configuration information may comprise a parameter indicating the total number, N, of UEs that the first UE may potentially be paired with in multi-user transmission.

The pre-configuration information may comprise a parameter indicating the number of UEs which the first UE is paired with in multi-user transmission.

The parameter indicating the number of UEs may indicate whether the first UE is, or is to be, paired with a single other UE or with two other UEs in multi-user transmission.

BRIEF DESCRIPTION OF THE DRAWINGS

Embodiments of the invention will be described, by way of example, with reference to the following drawings, in which.

DETAILED DESCRIPTION

Figure 1A:
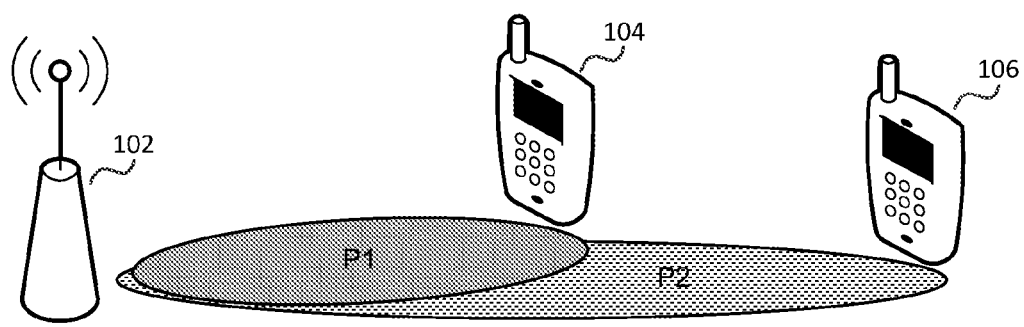
FIGS. 1a and 1b are schematic diagrams showing basic principles of the NOMA technique.

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Embodiments of the present invention provide a NOMA control signalling method and system.

According to the LTE standard, a DCI message is typically a part of the data in a subframe sent from a transmitter (e.g. an base station/eNodeB in an LTE network) to a receiver (e.g. a UE) and is typically associated with but not contained in the payload of the data in the subframe. It contains detailed information that the receiver can use for decoding the received data. Such information may include, for example, the size of the received data, what demodulation scheme to use for decoding the received data, etc.

In the case of multi-user transmission, data intended for a plurality of UEs may be combined into a single LTE subframe with overlapping time-frequency resources. For example, in the case of FIG. 1, the LTE subframe may contain data intended for both $UE_N$ and $UE_F$. Within the subframe, different power ratios may be used for transmitting data intended for different UEs as explained above.

Because the $UE_N$ receives both its own data and data intended for the $UE_F$ in a single subframe, the $UE_N$ needs to use a multi-user receiver to decode the combined data and to extract data intended for itself. To do this, the $UE_N$ would need to have at least the DCI information of the $UE_F$ and the DCI information of the $UE_N$.

The embodiments of the present invention provide a mechanism which allows a first UE (e.g. the $UE_N$ of FIG. 1) to know if it is paired with any other UE(s) (e.g. the $UE_F$) for multi-user transmission, and if so, which other UE(s) it is paired with. The mechanism also allows the first UE to obtain the DCI information of a second UE, which is paired with the first UE in a multi-user transmission subframe, so that the first UE could use a multi-user receiver to decode data intended for the first UE.

One or more parts of the data within a LTE subframe can be used for NOMA control signalling. One or more such fields may be used to indicate to a UE (referred to as the receiving UE) receiving the data whether the data within the subframe is for single-user transmission or multi-user transmission. The receiving UE would then use a multi-user receiver to decode the data in the case of multi-user transmission or use a single-user receiver to decode it in the case of single-user transmission. When the two UEs are configured as a pair for multiuser scheme, their "roles" are not symmetric. The embodiments of the present invention provide a signalling method that will indicate to each of the UEs what its "role" in the scheme is, and more specifically, provide a signalling mechanism to allow a UE to deduce whether it should apply a single-user receiver or a multi-user receiver.

Figure 1B:
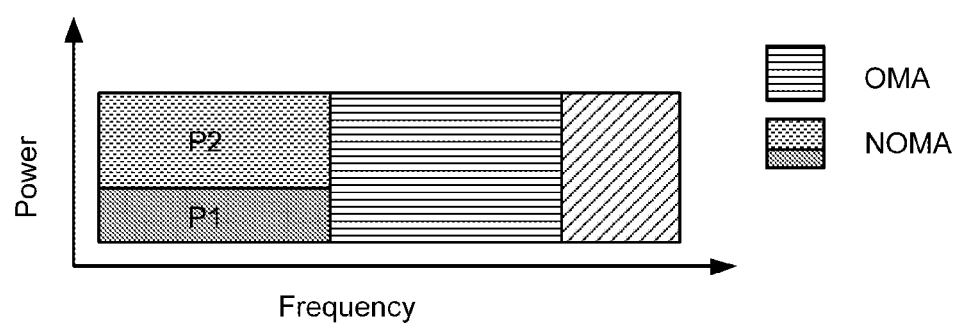

For the $UE_N$ in the case of FIG. 1, the ability to deduce which receiver to apply may be important, but the signalling mechanism also accounts for cases where the $UE_F$ is also required to apply a multi-user receiver, if capable (for example if the two UEs are close together).

In the case of the received data within a subframe being for multi-user transmission, one or more parts of the data may also be used to indicate with which other UE(s) the receiving UE is paired with for the purpose of the multi-user transmission. The receiving UE can then obtain the DCI information of the other UE(s) which it is paired with, and use a multi-user receiver and the DCI information of the other UE(s) to decode the data within the subframe and extract data intended for the receiving UE from the data.

According to embodiments of the present invention, a base station/eNodeB of an LTE network first identifies candidate UEs that may possibly be paired together for multi-user transmission. For example, the base station/eNodeB may consider the $UE_N$ and the $UE_F$ to be candidate UEs that may possibly be paired together as the multi-users in the multi-user transmission.

Initial Configuration

According to the embodiments of the present invention, a UE is first pre-configured to implement multiuser transmission via higher-layer signaling. The "higher-layer" in this context means a layer higher than the physical layer. The relevant parameters sent to a UE in the pre-configuration are described in Table 1 below.

TABLE 1

Pre-configuration list with parameters for multiuser transmission configuration

| Field | | Description |
|---|---|---|
| Multiuser enabled (optional) | | Bit(s) indicating if multiuser transmission is enabled |
| Multiuser pairing type (optional) | | Bit(s) indicating if single or double UE pairing is enabled |
| N_normal (optional) | | Number of entries in the list for normal coverage |
| Normal Coverage (LIST) | Cell radio network temporary identifier (C-RNTI) | C-RNTIs of the UEs which may potentially be paired with the UE receiving this pre-configuration message |
| | Power allocation ratio/index (optional) | Portion of the total power allocated to the UE receiving the message |

The field "Multiuser enabled" are bit(s) indicating if multiuser transmission is now enabled. If the field indicates multiuser transmission is not enabled, the receiving UE will consider the data it receives to be for single-user transmission only.

The field "Multiuser pairing type" is an optional field having bit(s) indicating if single or double UE pairing is enabled. In this context, single pairing means the receiving UE is to be paired with one other UE only, and double pairing means that the receiving UE is to be paired with two other UEs. It is possible to have this field indicating that the receiving UE is to be paired with any number of UEs.

The field "N_normal" is an optional field indicating the total number of UEs that the receiving UE may potentially be paired with.

C-RNTI of a UE is a unique identification specific to the UE and is linked with the DCI information of the UE. The eNodeB in an LTE network assigns different C-RNTI values to different UEs. A first UE, using the C-RNTI of a second UE, would be able to locate and retrieve the DCI information of the second UE from a DCI packet. In the case of FIG. 1, the $UE_N$ would be able to use the C-RNTI of $UE_F$ to locate and retrieve the DCI information of $UE_F$.

The field "Power allocation ratio/index" is an optional field indicating the portion of the total power allocated to the UE receiving the message.

Upon receiving the configuration of multi-user transmission, when the $UE_N$ receives data in an LTE subframe, the $UE_N$ will need to know if the data is for single-user transmission (in which case the $UE_N$ will use a single-user receiver to decode the data) or for multi-user transmission. If it is for multi-user transmission, the $UE_N$ will also need to know the other UE(s) that are being paired with the $UE_N$, and obtain the DCI information of the other UE(s) so that it can use a multi-user receiver to decode the data within the subframe to obtain data intended for itself. The $UE_N$ may achieve these according to one of the following embodiments.

1) CRC Based Signaling

The Cyclic Redundancy Checking (CRC) part is a field conventionally used for checking for errors in the data that has been transmitted. In a LTE network, the CRC part typically takes up a length of 16-bits and is typically scrambled by a Radio Network Temporary Identifier (RNTI), such as the Cell-RNTI (C-RNTI).

According to a first embodiment of the present invention, after the data within a subframe is received by a UE, instead of decoding the DCI message by verifying the CRC part is scrambled by $C\text{-}RNTI_N$ only as conventionally done, the receiving UE verifies whether the CRC is scrambled with the multiuser indication mask(s) and with $C\text{-}RNTI_N$. The receiving UE then compares the value in the CRC part with a plurality of multi-user indication masks. Table 2 shows an example of the multiuser indication mask(s) used by the receiving UE.

TABLE 2 multiuser indication masks

| k | Multi-user indication [Y/N] | Multi-user indication mask $<x_{MI,0}, x_{MI,1}, \ldots, x_{MI,15}>$ |
|---|---|---|
| 0 | No | <0, 0, 0, 0, 0, 0, 0, 0, 0, 0, 0, 0, 0, 0, 0, 0> |
| 1 | Yes | <0, 0, 0, 0, 0, 0, 0, 0, 0, 0, 0, 0, 0, 0, 0, 1> |
| 2 | Yes | <0, 0, 0, 0, 0, 0, 0, 0, 0, 0, 0, 0, 0, 0, 1, 0> |
| ... | Yes | ... |
| ... | Yes | ... |
| 16 | Yes | <1, 0, 0, 0, 0, 0, 0, 0, 0, 0, 0, 0, 0, 0, 0, 0> |

The receiving UE may be pre-configured with the masks in table 2, or be updated to use the masks in table 2 at any stage.

The binary value of the 16-bit CRC part of a DCI packet in received data may pass one of the 17 masks (designated by k=0-16) above at a receiving UE.

When the CRC part of the data is scrambled to be all zeros, it will only pass the bit-mask of k=0 in Table 2. As the mask of k=0 indicates that the currently received packet is not for multi-user transmission and is intended for the receiving UE only, the receiving UE will decode this data within the subframe by applying a single-user receiver.

On the other hand, when the CRC part passes the bit-mask k, where k≠0, the receiving UE is able to deduce that multi-user transmission is enabled for the data within the current subframe. The receiving UE will then try to identify which UE(s) the receiving UE is paired with so that it can obtain the DCI information of these UE(s) for decoding the data within the current subframe.

The mask index k in the CRC part along with the pre-configuration information (as explained with reference to table 1) can be used together to indicate which UE(s) are paired with the receiving UE. Table 3 shows the mapping between the mask index k and the pairing of UE(s).

TABLE 3

Index of UEs in the configuration list which are being paired as a function of {k, N, single/double pairing}

| mask index | Single pairing | Double pairing | | | | |
|---|---|---|---|---|---|---|
| | | Number of UEs in configuration list N | | | | |
| k | N ≤ 15 | N = 1 | N = 2 | N = 3 | N = 4 | N = 5 |
| 1 | 1 | 1 | 1 | 1 | 1 | 1 |
| 2 | 2 | | 2 | 2 | 2 | 2 |
| 3 | 3 | | 1,2 | 3 | 3 | 3 |
| 4 | 4 | | | 1,2 | 4 | 4 |
| 5 | 5 | | | 1,3 | 1,2 | 5 |
| 6 | 6 | | | 2,3 | 1,3 | 1,2 |
| 7 | 7 | | | | 1,4 | 1,3 |
| 8 | 8 | | | | 2,3 | 1,4 |
| 9 | 9 | | | | 2,4 | 1,5 |
| 10 | 10 | | | | 3,4 | 2,3 |
| 11 | 11 | | | | | 2,4 |
| 12 | 12 | | | | | 2,5 |
| 13 | 13 | | | | | 3,4 |
| 14 | 14 | | | | | 3,5 |
| 15 | 15 | | | | | 4,5 |
| 16 | 16 | | | | | |

Table 3 shows that the UEs are being paired as a function of {k, N, single/double pairing}.

As explained above, the higher-layer pre-configuration information indicates whether single or double pairing is used for the packet (subframe). It also indicates N, which is the total number of UEs that the receiving UE can be potentially paired with. N can be obtained from the parameter "N_normal" in table 1. N equals to or can be deduced from the number of C-RNTIs in the configuration list.

As an example, when the higher-layer pre-configuration indicates that double-pairing is applicable and N=3 UEs, upon detecting mask index k=6, the receiving UE can deduce that it is paired with the $2^{nd}$ and $3^{rd}$ UEs from the configuration list.

Then, the receiving UE will use the C-RNTIs of the $2^{nd}$ and the $3^{rd}$ UEs given in the higher-layer pre-configuration information to obtain the DCI information of the 2nd and the 3rd UEs. With the DCI information of the 2nd and the 3rd UEs, the receiving UE may apply a multiuser receiver to extract data intended for itself from the received data.

2) DCI Based Signaling

According to the second embodiment, the carrier indicator field (CIF) in data within a LTE subframe provides the dynamic indication of whether multiuser transmission is on/off and if on, which UE the receiving UE is paired with. The CIF field is a field within the DCI message and can carry 0 or 3 bits depending on the format of the DCI used. In this embodiment, we use the DCI format which provides a CIF field of 3 bits.

When UE is pre-configured to enable multi-user transmission, it will imply that the CIF field is in use for indication in multi-user transmission. The receiving UE will interpret the 3 bit CIF value according to the mapping in Table 4. A CIF value of 0 means that multi-user transmission is not applied to the current subframe.

As an example, when higher-layer configuration indicates that double-pairing is used and N=3, upon detecting that the CIF value is 0b'100 (or decimal number 4), the receiving UE will be able to deduce according to table 4 that it is paired with the 1st and the 2nd UEs in the configuration list.

TABLE 4

Index of UEs in the configuration list which are being paired as a function of {CIF value, N, single/double pairing} when signalling via CIF

| CIF value | Single pairing | Double pairing | | |
|---|---|---|---|---|
| | Number of UEs in configuration list N | | | |
| | N ≤ 6 | N = 1 | N = 2 | N = 3 |
| 1 | 1 | 1 | 1 | 1 |
| 2 | 2 | | 2 | 2 |
| 3 | 3 | | 1,2 | 3 |
| 4 | 4 | | | 1,2 |
| 5 | 5 | | | 1,3 |
| 6 | 6 | | | 2,3 |

3) Modification for Supporting Coverage Enhancements

According to a third embodiment, one signaling enhancement can be done to support pairing a UE in multi-user transmission with UE(s) configured to operate Coverage Enhancements (CE). The CE has been defined in LTE Rel-13 and provides an enhanced range of signal coverage. For a UE configured to operate CE, the same data block needs to be transmitted towards the UE repetitively for a number of times over a period of time. This is to compensate for very low Signal-to-Noise Ratio due to poor received signal strength at the UE operating CE, which is normally located far from a base station/eNodeB.

Pairing between DL transmission of normal UE and DL data/control transmission of UE operating CE is beneficial in several aspects: 1) UE operating CE can inheritably be considered as the far-user (large path-loss); 2) UE operating CE is assumed to be in low-mobility so pairing could be relevant for longer period. This eases the pairing effort. 3) Since the same data is sent many times to the UE operating CE, the burden on the $UE_N$ receiver is relaxed. According to the third embodiment, all the DCI information of the UE(s) with which the receiving UE is to be paired is sent as pre-configuration information via higher-layer signaling, so that the receiving UE will not be required to decode/deduce it as in the case of the first and the second embodiments. This is mainly due to the fact that for a UE operating CE, DCI is sent in a dedicated channel which is unlikely to be supported by most UEs. The overhead with additional higher layer data is not high compared to the expected long span of the transmission.

An example of the pre-configuration sent to a UE according to the third embodiment is shown in Table 5.

TABLE 5

| Higher layer configuration with enhanced coverage UE(s) | | |
|---|---|---|
| Field | | Description |
| Multiuser enabled | | Bit indication if multiuser transmission is now enabled |
| Multiuser pairing type (optional) | | Bit indication if single or double UE pairing is enabled |
| N_normal (optional) | | Number of entries in the list for normal coverage |
| N_enhanced (optional) | | Number of entries in the list for enhanced coverage |
| Normal Coverage (LIST) | Cell radio network temporary identifier | C-RNTIs of the UEs within the normal coverage, which may potentially be paired with the UE receiving this pre-configuration message |
| | Power allocation ratio/index (optionally) | Portion of the total power allocated to the UE receiving the message |
| Enhanced Coverage (LIST) | Cell radio network temporary identifier | C-RNTIs of the UEswithin the enhanced coverage, which may potentially be paired with the UE receiving this pre-configuration message |
| | Power allocation ratio/index (optionally) | Portion of the total power allocated to the UE receiving the message |
| | DCI content | Other DCI content relevant for detection |

Table 5 comprises all information in table 1, and additionally comprises optional parameter "$N_{13}$ enhanced", which indicates the number of UEs within the enhanced coverage that the receiving UE may be potentially paired with. Table 5 also additionally comprises the C-RNTIs and the DCI content of the UEs within the enhanced coverage, which the receiving UE may be potentially paired with.

Figure 2A:
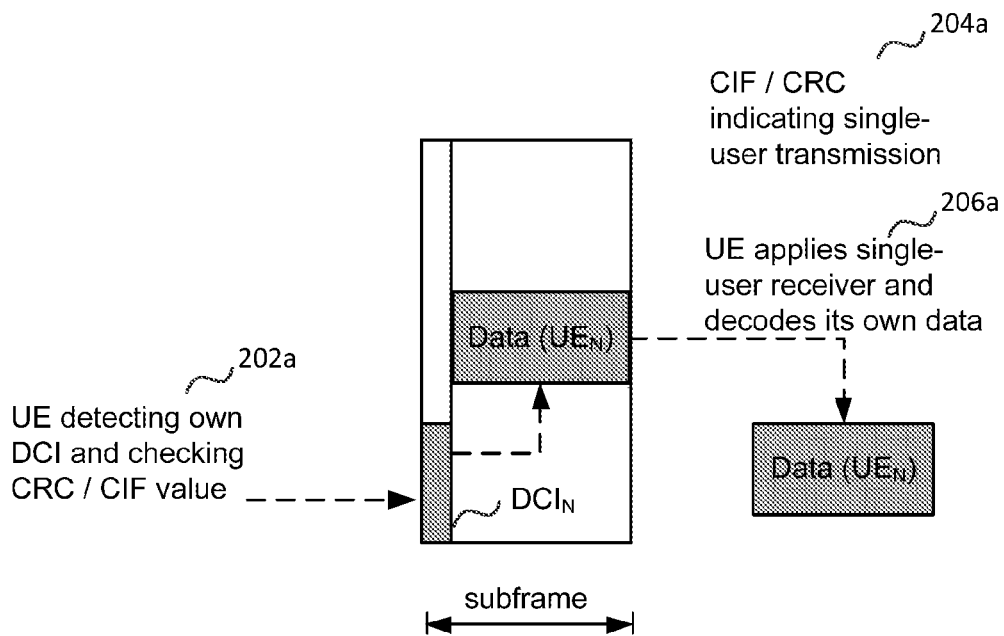
FIG. 2a is a schematic diagram showing how data in a subframe is decoded by a single-user receiver according to various embodiments of the present invention.

FIG. 2a is a schematic diagram showing how data in a subframe is decoded by a single-user receiver according to the embodiments of the present invention. The subframe is intended for single-user communication, so it only comprises the data and the DCI intended for the receiving UE.

In step 202a, the receiving UE detects its own DCI from the received data in the subframe and checks a dynamic indicator, e.g. the CRC value (as in the case in the first embodiment) of the DCI packet or the CIF value (as in the case of the second embodiment). In step 204a, the UE founds that dynamic indicator, i.e. the CRC/CIF value, indicates single-user transmission. The single-user transmission can be indicated by, e.g. the bits in the CRC part/CIF field being all zeros as explained with reference to Tables 3 and 4 above. In step 206a, the receiving UE applies its single-user receiver and decode its own data.

Figure 2B:
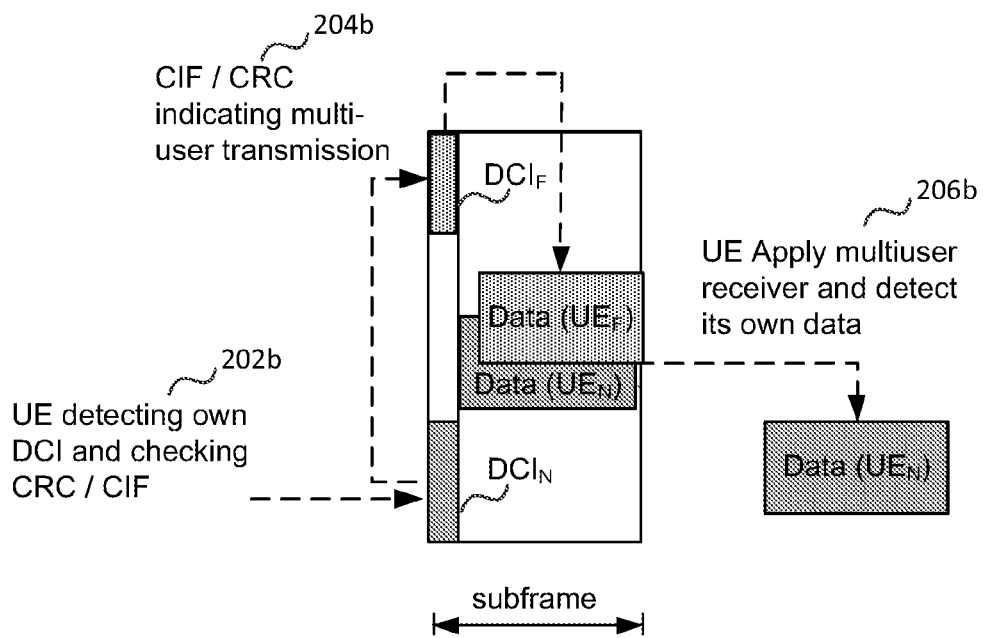
FIG. 2b is a schematic diagram showing how data in a subframe is decoded by a multi-user receiver according to the first and the second embodiments of the present invention.

FIG. 2b is a schematic diagram showing how data in a subframe is decoded by a multi-user receiver according to the first and the second embodiments of the present invention. The subframe is intended for multi-user communication, and comprises the data and the DCI intended for the receiving UE, e.g. $UE_N$ of FIG. 1, as well as the data and the DCI intended for a UE paired with the receiving UE, e.g. $UE_F$ of FIG. 1. The data intended for $UE_N$ and data intended for $UE_F$ share the same time and frequency slot and superimpose each other in the subframe.

In step 202a, the $UE_N$ detects its own DCI from the received data in the subframe and checks a dynamic indicator, e.g. the CRC or CIF value as explained above. In step 204a, the $UE_N$ founds that the CRC/CIF value indicates multi-user transmission, and identifies $UE_F$ that it is paired with. This can be identified in the way explained with reference to Table 3 in the case of CRC or Table 4 in the case of CIF. Then $UE_N$ retrieves the DCI information of $UE_F$ from the data received in the subframe. In step 206a, the receiving UE applies its multi-user receiver and decodes its own data based at least on the DCI information of $UE_N$ and $UE_F$.

Figure 2C:
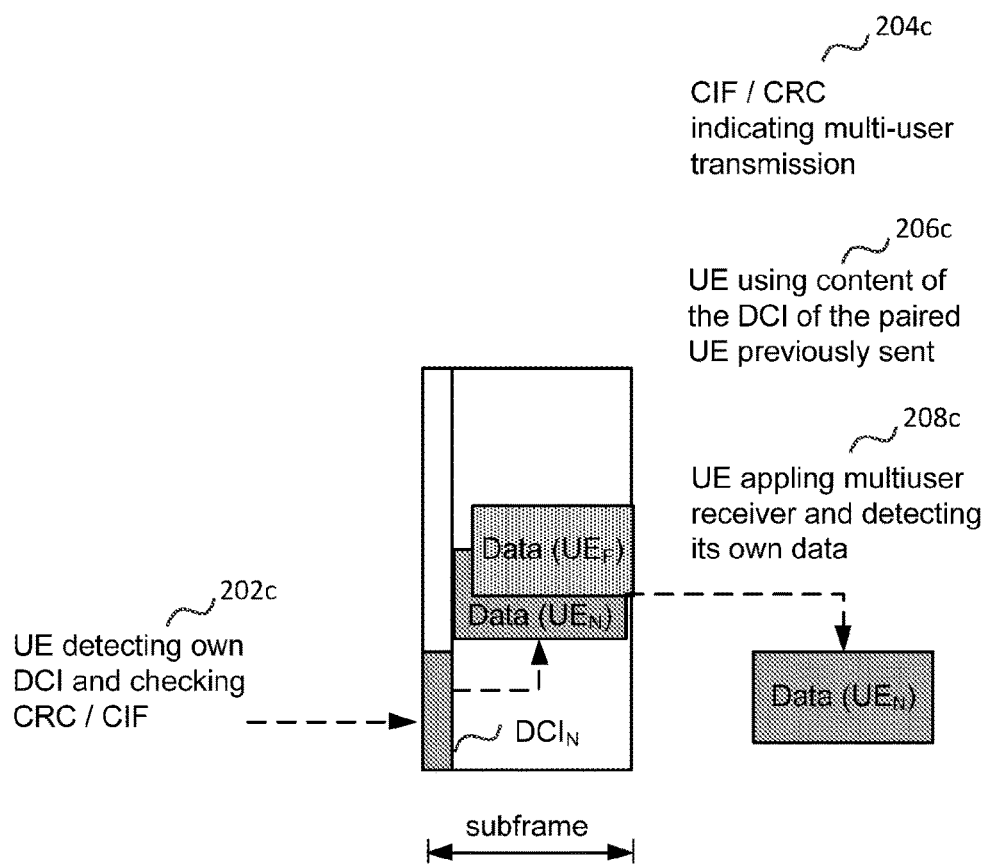
FIG. 2c is a schematic diagram showing how data in a subframe is decoded by a multi-user receiver implementing Enhanced Coverage according to the third embodiment of the present invention.

FIG. 2c is a schematic diagram showing how data in a subframe is decoded by a multi-user receiver implementing Enhanced Coverage according to the third embodiment of the present invention.

In step 202c, the $UE_N$ detects its own DCI from the received data in the subframe and checks a dynamic indicator, e.g. the CRC or CIF value. In step 204c, the $UE_N$ founds that the CRC/CIF value indicates multi-user transmission. This can be identified in the way explained with reference to Table 3 in the case of CRC or Table 4 in the case of CIF. Then in step 206c, the $UE_N$ retrieves the DCI information of $UE_F$ from the higher-layer pre-configuration information it received previously. An example of the higher-layer pre-configuration information in the case of CE is given in Table 5. In step 208c, the receiving UE applies its multi-user receiver and decodes its own data based at least on the DCI information of $UE_N$ and $UE_F$.

Figure 3:
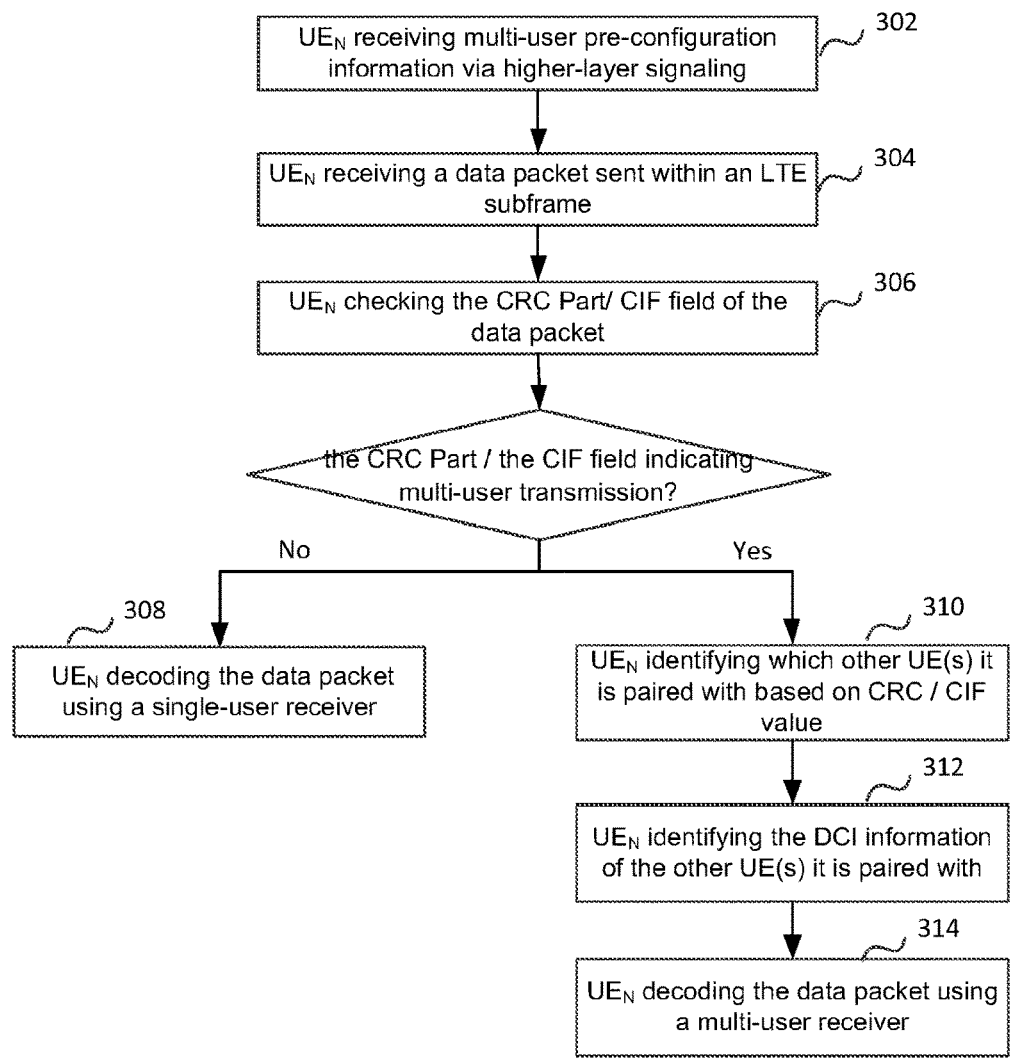
FIG. 3 is a flow chart illustrating a method performed by a UE according to the first and the second embodiments of the present invention.

FIG. 3 shows a method by which a first UE (e.g. the $UE_N$ of FIG. 1) could obtain the DCI information of a second UE, which is paired with the first UE in multi-user transmission, according to the first and the second embodiments. In step 302, the first UE receives multi-user pre-configuration information via higher-layer signaling. An example of the multi-user pre-configuration information is provided in table 1.

In step 304, the first UE receives data sent within an LTE subframe. In step 306, the first UE checks a dynamic indicator, e.g. the value in the CRC part of the PCI packet of the received data according to the first embodiment or in the CIF field of the received data according to the second embodiment. If the CRC part or the CIF field indicates that the data in the subframe is for single-user transmission, then in step 308, the first UE will consider the data to be wholly intended for itself and will decode the data within the subframe using a single-user receiver.

On the other hand, if the CRC part of the received DCI packet or the CIF field indicates that the data in the subframe is for multi-user transmission, then in step 310, the first UE will identify which other UE(s) it is paired with. The first UE can identify the other UE(s) it is paired with using a multiuser indication mask (an example of which is given in table 2) and a pairing index (an example of which is given in table 3) in the case of CRC based signaling according to the first embodiment. Alternatively, the first UE can identify the other UE(s) it is paired with using the CIF value and a pairing index (an example of which is given in table 4) in the case of CIF based signaling according to the second embodiment.

In step 312, the first UE searches the data within the subframe to identify the DCI information of the other UE(s) it is paired with. In step 314, the first UE decodes the data using a multi-user receiver and the DCI information of the UE(s) it is paired with. The data for multi-user transmission has both data intended for the first UE and data intended for the UE(s) the first UE is paired with. The decoding performed by the first UE extracts the data intended for the first UE from the data within the subframe.

Figure 4:
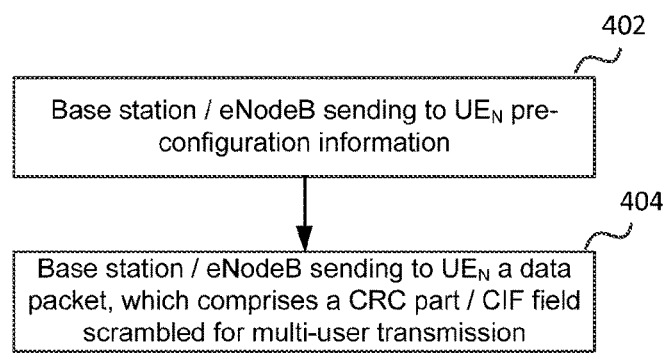
FIG. 4 is a flow chart illustrating a method performed by a base station/eNodeB according to the first and the second embodiments of the present invention.

FIG. 4 is a flow chart showing a method performed by a base station/eNodeB according to the first and the second embodiment. In step 402, the base station/eNodeB sends to $UE_N$ pre-configuration information for pre-configuring the $UE_N$ for downlink multi-user transmission. The pre-configuration information may comprise C-RNTI and/or DCI information of at least one second UE which may potentially be paired with the first UE in downlink multi-user transmission. An example of the pre-configuration information is shown in table 1.

In step 402, base station/eNodeB sends to $UE_N$ data within a subframe. The data may comprise a dynamic indicator, e.g. a CRC value according to the first embodiment or a CIF value according to the second embodiment. The CRC part/the CIF field is scrambled for multi-user transmission as explained with reference to the embodiments such that it can be used by the $UE_N$ to deduce if the data is for downlink multi-user transmission, to identify the UE(s) paired with the $UE_N$ in for multi-user transmission and to retrieve the DCI information of the UE(s) for decoding the data within the subframe.

Figure 5:
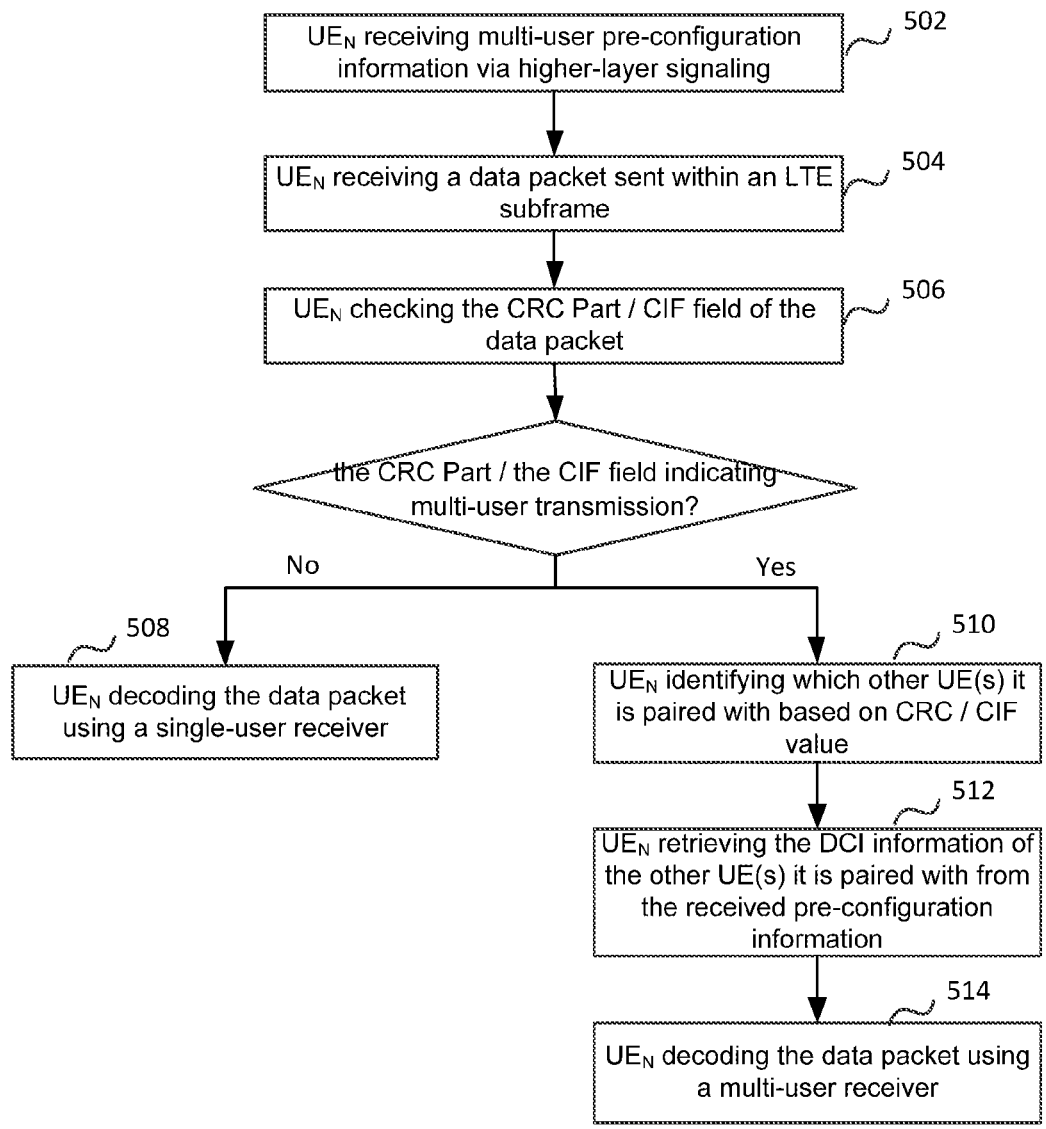
FIG. 5 is a flow chart illustrating a method performed by a UE according to the third embodiments of the present invention.

FIG. 5 shows a method by which a first UE (e.g. the $UE_N$ of FIG. 1) could obtain the DCI information of a second UE implementing Enhanced Coverage, which is paired with the first UE in multi-user transmission, according to the third embodiment.

Steps 502-510 in FIG. 5 are essentially the same as steps 302-310 in FIG. 3, except that in step 502 the multi-user pre-configuration information received by $UE_N$ contains information on UE(s) implementing Enhanced Coverage, for which Table 5 provides an example.

In step 512 the $UE_N$ obtains the DCI information of the UE(s) it is paired with from the pre-configuration information it received in step 502. In step 514, the first UE decodes the data within the subframe using a multi-user receiver and the DCI information of the UE(s) it is paired with.

These sections of the method are provided by way of example only and other sections may also be utilised. The disclosure of this application is not restricted by the specific combination of steps shown in the figures, and described herein, but includes any appropriate subsets or combinations of steps performed in any appropriate order. Sections of the method may be performed in parallel.

Embodiments of the present invention allow the network to dynamically switch the multi-user scheme on/off per subframe, without the need to re-configure multiuser transmission as a separate message and the need for the receiving UE to perform redundant processing. This minimizes the signaling required, and hence minimizes power-consumption and processing time for UEs.

A second benefit of the embodiments is the flexibility of coupling normal UEs (i.e. those not supporting multi-user transmission) as $UE_F$.

The term 'user equipment' (UE) is used herein to refer to any device with processing and telecommunication capability such that it can perform the methods according to the embodiments of the present invention. Those skilled in the art will realize that such processing and telecommunication capabilities can be incorporated into many different devices and therefore the term 'user equipment' includes mobile telephones, personal digital assistants, PCs and many other devices.

Although in the embodiments and examples given above, the $UE_N$ has been considered to the be receiving UE and has the capability to deduce whether to apply a single-user receiver or a multi-user receiver and the ability to identify pairing UE(s) and their DCI information, the skilled person would appreciate that the $UE_F$ or any other UE(s) in the LTE network may be considered to the be receiving UE and have the above capabilities, if required.

Although in the above embodiments, only single pairing and double pairing have been given as examples, it will be appreciated that a UE can be paired with any number of UEs and the methods according to the embodiments can be adapted accordingly.

The masks in table 2 and the indexing tables 3 and 4 can be altered without losing the effect sought, as will be apparent to the skilled person.

Any range or device value given herein may be extended or altered without losing the effect sought, as will be apparent to the skilled person.

Although in the above embodiments, the CRC part or the CIF field provides the dynamic indicator indicating whether the receiving UE is paired with any other UE(s) and identifying the pairing UE(s), the skilled person may use another any other part or field of a data within a subframe to accommodate the dynamic indicator without losing the effect sought.

Although the above embodiments are described in the context of an LTE network, the skilled person may adapt the embodiments for use in any other telecommunication network or with any other telecommunication standard without losing the effect sought.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the scope of this invention.

The invention claimed is:

1. A method for configuring downlink multi-user transmission where at least a second UE may potentially be paired with a first UE in a telecommunication network, the method comprising:
    receiving at the first UE, pre-configuration information for multi-user transmission, said pre-configuration information being provided over a radio link in signalling at a layer higher than a physical layer, wherein the pre-configuration information comprises an indication if multiuser transmission is enabled for the first UE, wherein the pre-configuration information comprises a portion of a total power allocated to the first UE, used for transmitting data with overlapping time-frequency resources intended for different UEs,
    receiving, at the first UE, data within a subframe wherein the data comprises a dynamic indicator; and
    determining, by the first UE based on the received dynamic indicator, if the data within the subframe is for multi-user transmission.

2. The method of claim 1, further comprising:
    if it is not determined that the data within the subframe is for multi-user transmission,
        using, by the first UE, a single-user receiver to decode the received data; and
    if it is determined that the data within the subframe is for multi-user transmission, identifying, by the first UE based on the dynamic indicator, at least one second UE that is paired with the first UE in multi-user transmission, and obtaining, by the first UE, DCI information of said at least one second UE and decoding, by the first UE using a multi-user receiver and based on the DCI information of the at least one second UE, the received data to obtain data intended for the first UE.

3. The method of claim 2, wherein said obtaining DCI information comprises obtaining, by the first UE from the data transmitted within the subframe, DCI information of the at least one second UE.

4. The method of claim 2, wherein said obtaining DCI information comprises obtaining, by the first UE from the pre-configuration information, DCI information of the at least one second UE.

5. The method of claim 4, wherein said pre-configuration information comprises DCI information of UE(s) implementing Enhanced Coverage (CE).

6. The method of claim 2, wherein said obtaining DCI information of the at least one second UE comprises obtaining by the first UE said DCI information based on the C-RNTI of the at least one second UE.

7. The method of claim 1, wherein the pre-configuration information comprises C-RNTI of the UE(s) that may potentially be paired with the first UE in downlink multi-user transmission.

8. The method of claim 1, wherein the pre-configuration information comprises a parameter indicating the total number, N, of UEs that the first UE may potentially be paired with in multi-user transmission.

9. The method of claim 8, wherein the parameter indicating the number of UEs indicates whether the first UE is, or is to be, paired with a single other UE or two other UEs in multi-user transmission.

10. The method of claim 1 wherein the pre-configuration information comprises a parameter indicating the number of UEs which the first UE is paired with in multi-user transmission.

* * * * *